United States Patent [19]
Melanson

[11] 4,118,828
[45] Oct. 10, 1978

[54] APPARATUS FOR PEELING SAUSAGES

[75] Inventor: Leslie B. Melanson, Manasquan, N.J.

[73] Assignee: Linker Machines, Inc., Newark, N.J.

[21] Appl. No.: 749,492

[22] Filed: Dec. 10, 1976

[51] Int. Cl.² ............................................. A22C 11/00
[52] U.S. Cl. ........................................... 17/1 F; 17/49
[58] Field of Search ......................... 17/1 F, 49, 33, 35

[56] References Cited

U.S. PATENT DOCUMENTS

| 2,670,498 | 3/1954 | Mosby | 17/1 F |
|---|---|---|---|
| 2,954,579 | 10/1960 | Menghini | 17/1 F |
| 3,312,995 | 4/1967 | Garey | 17/1 F |
| 3,487,499 | 1/1970 | Klyce | 17/1 F |
| 3,570,044 | 3/1971 | Gartrell | 17/1 F |
| 3,646,637 | 3/1972 | Berendt et al. | 17/1 F |
| 3,716,891 | 2/1973 | Diemarest | 17/1 F |
| 3,895,414 | 7/1975 | Klyce | 17/1 F |
| 3,975,795 | 8/1976 | Kupcikevicius et al. | 17/49 |

FOREIGN PATENT DOCUMENTS 303,950 9/1968 Sweden ........................................ 17/1 F Primary Examiner—Louis G. Mancene
Assistant Examiner—Paul J. Hirsch
Attorney, Agent, or Firm—Nolte and Nolte

[57] ABSTRACT

Apparatus for peeling casings from a string of sausages comprises roller means for driving that string of sausages past a knife assembly disposed to form a longitudinal slit in the casings, means are disposed downstream of the knife assembly for directing a jet of air towards the sausages to assist in the separation of the casings from the meat of the sausage and a vacuum wheel, across which the sausages are caused to pass and at which the casings are pulled away from the sausages to pass to a disposal region, is also provided. The apparatus is one which is easily disassembled for cleaning and repair purposes and one which is readily adjusted to handle sausages of different sizes.

3 Claims, 3 Drawing Figures

APPARATUS FOR PEELING SAUSAGES

BACKGROUND OF THE INVENTION

This invention is concerned with apparatus for removing the casings of sausages. It is well known that sausages are manufactured as a continuous string, the individual links of the sausages being separated by a ligature or a twisted portion of the continuous tube of casing material within which the meat of the sausage is disposed. After formation of the string of sausages, they are subject to various processes; most commonly they are subject to a curing or smoking process. Thereafter, the individual sausages are separated and one technique for separating sausages which are sold in so-called skinless form is to remove the casings since, the casings being made up of a continuous tube of casing material, removal of that casing will result directly in separation of the individual sausages.

The most commonly adopted technique to this end is to cause the sausages to move, as a string, past a slitting knife which forms a longitudinal slit in the casing and thereafter to cause the string with the slit casing to pass across a perforated wheel, the interior of which is exposed to a vacuum so that the casings are drawn across the wheel as the wheel rotates while the individual sausages pass tangentially beyond the wheel. Typical of such an arrangement is that described in U.S. Pat. No. 3,312,995, issued Apr. 11, 1967 to Garey and assigned to Ranger Tool.

A major problem in the industry has been the handling of sausages of different sizes which cover a considerable range.

Another problem is the complexity of the prior art arrangements which has tended to render the disassembly of the equipment for cleaning purposes which, since this is a food handling industry, is extremely important, difficult.

It is an object of the present invention to provide an apparatus which is effective to peel sausages of considerably different sizes and also to provide an apparatus which is simple and easily disassembled for servicing and cleaning purposes.

BRIEF SUMMARY OF THE PRESENT INVENTION

According to this invention there is provided a sausage peeling apparatus which has means defining a path for a string of sausages, a knife assembly and a vacuum wheel which is effective to remove slit casings from the sausages. In such an arrangement there is provided a guide element for guiding the sausages relatively to the knife assembly which effects the longitudinal slitting process, that guide assembly comprising a removable insert which can be removed and replaced to accommodate different sizes of sausages.

In such apparatus it is desirable to have the drive mechanism associated with the various elements of the apparatus, particularly the vacuum wheel, rendered simple so that the wheel may be easily removed from the assembly for cleaning purposes.

Other elements of the device are arranged to be easily removed for cleaning purposes.

BRIEF DESCRIPTION OF THE FIGURES OF THE DRAWINGS

An embodiment of this invention is illustrated in the accompanying drawings in which.

DESCRIPTION OF THE PREFERRED EMBODIMENTS

Figure 1:
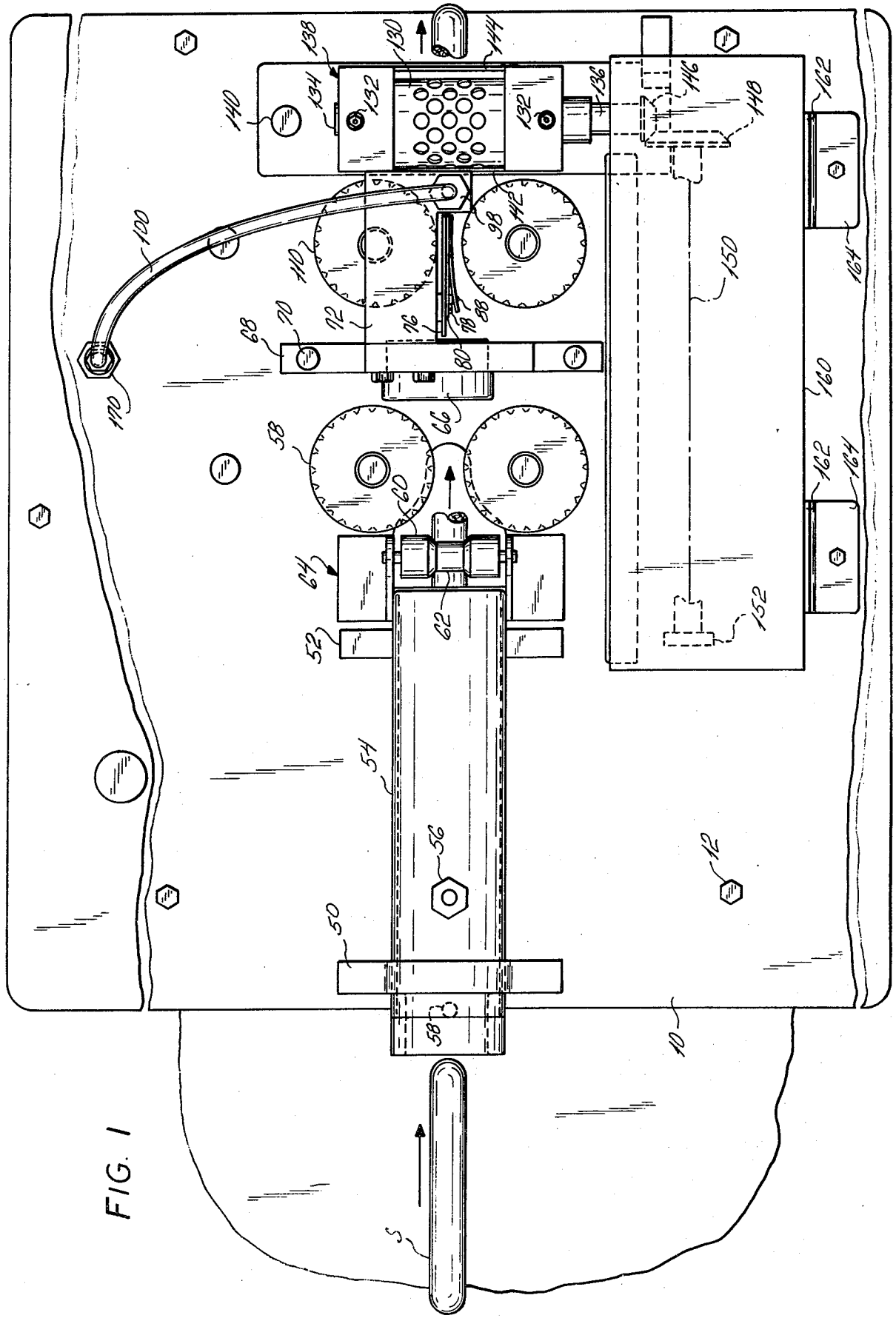
FIG. 1 is a plan view of the apparatus of this invention.
Figure 2:
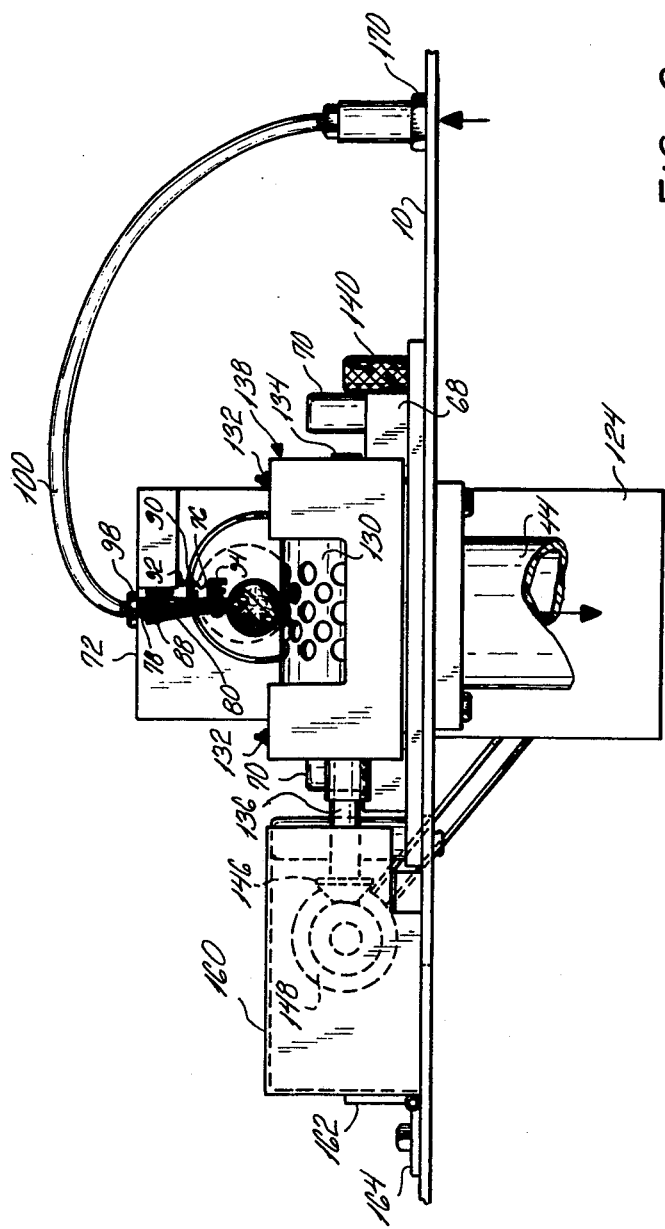
FIG. 2 is an end elevation of the apparatus of this invention with certain parts removed in the interests of clarity.

The apparatus in the drawings comprises a main frame of generally rectangular form to the vertical sides of which are secured removable panels and to the top of which is secured a base plate 10, that base plate being secured to the frame by as few strategically located bolts 12 as possible so that it may be quickly and easily removed from the frame as required for servicing.

Figure 3:
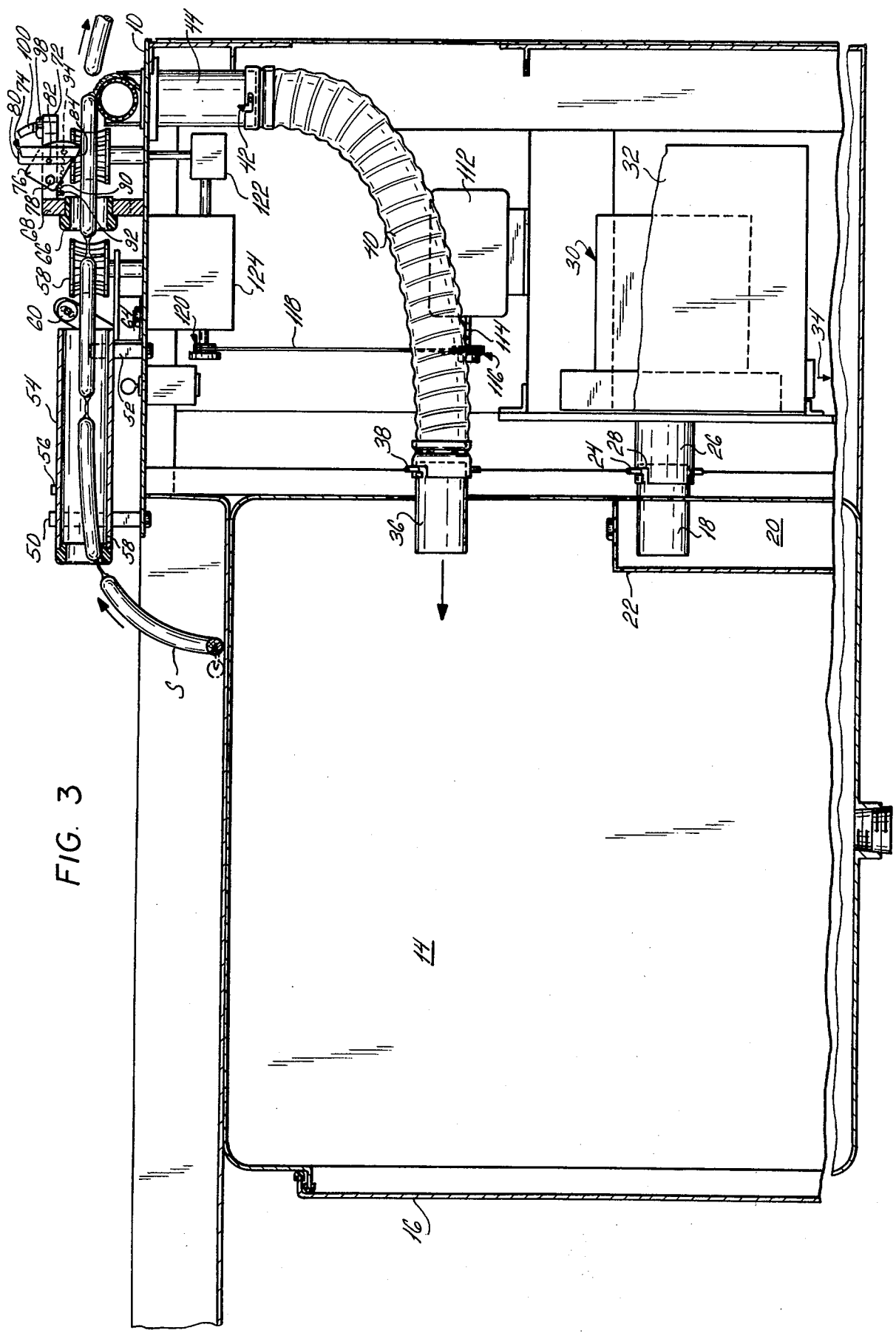
FIG. 3 is a side elevation of the apparatus of the present invention.

Disposed within the frame and as can be seen in FIG. 3, there is a vacuum tank 14 with a sealed, removable cover 16 allowing access to the interior of that tank. At a lowermost corner of the tank 14 there is a tube 18 which projects from a region 20 of the vacuum tank separated from the remainder of the tank by a filter element 22, and to the exterior of that tank. The outermost portion of the tube 18 is provided with bayonet-type pins 24 by which a connection to a tube 26 provided with correspondingly L-shaped bayonet slots 28, may be made. The tube 26 is connected to a vacuum motor and fan structure indicated generally at 30 enclosed within a cover 32 from which an air discharge 34 issues.

A tube 36 extends through the side wall of the vacuum tank 14 and in similar fashion to tube 18 is provided with bayonet connection pins 38 by which a hose 40 is quickly and easily connected and removed therefrom.

The end of hose 40 remote from tube 36 is connected by a bayonet fastening indicated generally at 42 to a tubular structure 44 depending from base plate 10. The purpose of the tubular structure 44 is described hereinafter.

Mounted within brackets 50 and 52 secured to the base plate 10 is a steam tube 54 to which, as required, a steam hose may be connected at union 56 and through which a chain or string of sausages indicated generally at S is conducted. A condensate drain hole 58 is formed in the lowest portion of the steam tube. From the steam tube the string of sausages issues to a pair of feed rolls 58, first passing beneath a guide roll 60 which has a reduced diameter central section 62 and which is mounted to be slidable in a hold-down roller assembly indicated generally at 64 to bear upon sausages passing therebelow by gravity.

From the pair of feed rollers 58 the string of sausages passes through a guide insert 66 (see particularly FIG. 3) which is of ring-like shape having a central through hole, the lowermost edge of which is effective to define the position of the string of sausages passing therethrough. The outer diameter of the insert is received within a corresponding opening of a bracket 68 which is secured to the base plate by bolts 70 so as to be easily removed from the base plate for cleaning purposes.

The guide insert has a shoulder which abuts the upstream side of bracket 68 adjacent the marginal edges of the opening within which the guide insert is inserted, in this way to prevent the frictional forces generated between the string sausages and the insert from moving that insert from the bracket.

The bracket 68 includes a generally horizontally disposed plate-like structure 72 upon which a knife assembly indicated at 74 is pivotally mounted. That assembly comprises a plate 76 pivoted as at 78 to the plate 72 and pivotally mounted, about pin 82, to plate 76 is a blade backing plate 80 which has a blade secured to it. The blade is of spring steel and has an edge 84 which in use lies generally close to the adjacent edge of the blade support plate 80. The blade has a key-hole opening in it which is engaged on a correspondingly necked stud mounted to the blade support plate and the end of the blade remote from its cutting edge is mounted upon a pin 88 so that the blade is flexed to maintain its cutting edge flush with the blade support plate.

A spring 90 extends from a pin 92 of bracket arm 72 to a pin 94 of the plate 76 and exerts a force on that plate to move the plate in a clockwise direction as viewed in FIG. 3, i.e. to cause the cutting edge of the blade to be biased towards the string of sausages passing therebelow.

Downstream of the knife assembly and also mounted upon the bracket arm 72 is a union 98 to which a hose 100 is connectable, hose 100 communicating with a source of filtered compressed air. The role of the compressed air in peeling the sausages will be described hereinafter.

Immediately adjacent the region where the knife contacts the string of sausages is a second pair of drive rollers 110.

Both sets of drive rollers 58 and 110 are driven by motor 112 disposed within the frame of the apparatus. The shaft 114 of the motor carries a pair of pulleys indicated at 116 about one of which a belt 118 is trained. The belt extends from the pulley assembly 116 to pulley assembly 120 mounted upon the shaft 122 of a gear box 124. The gear box includes a pair of worms which are engageable with worm wheels mounted upon the shafts of drive rollers 58 and 110 and in part drive to those rollers to cause the string of sausages to pass through the apparatus. Most desirably, the shafts supporting the rollers or at least one of each pair of those shafts is of the floating kind such as that shown in U.S. Pat. No. 3,716,891 issued Feb. 20, 1973 to Demarest and which is pivoted in such a way that the worm wheel thereof remains in engagement with its associated worm of the shaft of the gear box while the drive roller itself may be biased towards the string of sausages, in effect pivoting about its worm wheel connection to the worm of the gear box. The inclusion of two pulleys in the pulley assemblies 116 and 120 allows an operator to select to drive the apparatus at two different speeds.

The sausages issue from the driven rollers 110 to pass over a perforated suction roller or vacuum wheel 130, the ends of which are closed by disc-like structures one of which has a stub 134 and the other of which has an axle 136. The vacuum wheel is disposed within a housing or casing indicated generally at 138 in which nipples 132 are formed so that the bearings mounting the wheel may be lubricated. The housing is secured to the base plate 10 by screws 140 which have knurled heads so that the housing is easily removed from the base plate.

The upstanding edge 142 of the housing has a close clearance with the adjacent portion of the vacuum wheel while upstanding edge 144 of the casing is spaced from the adjacent portion of the wheel by an amount sufficient to allow the casings of sausages to pass between that upstanding wall and the wheel. It will be appreciated that the sausage casing material is thin, however it not infrequently occurs that knots or slubs appear in the casing as it is removed from the sausages and as such it is necessary that the gap through which the sausage casing is passed be rather larger than the thickness of the casing material.

On the end of the shaft 136 there is secured a bevel gear 146 which meshes with a corresponding bevel gear 148 mounted upon a drive shaft of which the center line is indicated at 150 and which, at its end remote from gear 148, has a sprocket 152. A chain, shown only schematically in the drawings, extends from sprocket 152 to a sprocket of gear box 124.

The sprocket 152 and gears 148 and 146 are enclosed within a generally box-like housing 160 which is secured to upstanding leaves 162 of hinge elements 164 the other leaves of those hinge elements being secured to base plate 10.

It will be appreciated that by simply removing screw 140 and by pivoting casing 160 about hinges 164, the suction wheel assembly may simply be removed from the base plate.

Most desirably, the string of sausages is supported in a tray mounted on top of the vacuum tank 14 and the top of the vacuum tank is lower than the entrance end of the steam tube 54 so that the sausages, as they are drawn from the tray, tend to be stretched and straightened.

It will be appreciated that with the structure described herein the insert 66 can readily be removed and replaced by another as desired. The insert is of such material as nylon, and has a central through opening, the lower marginal edges of which are so disposed that the upper surface of a sausage passing the knife assembly is at an optimum height for slitting. Thus, the device is useful for peeling sausages from large sizes down to small cocktail frankfurters.

Additionally, the knife is adjustable relative to plate 76 so that it projects to a greater or lesser extent, depending upon the casing to be slit so that it can be adjusted simply to slit the casing and not to cut into the meat of the sausage or to cut into the meat of the sausage only to a very small extent. As the sausages, with their casings slit, pass the vacuum wheel 130, the casings will adhere to the vacuum roller and will pass through hose 40 to the vacuum tank to be removed as required by opening the cover 16.

The supply of pressurized air to union 72 which includes a simple nozzle may be from any convenient source and in particular in the embodiment here illustrated, a quick disconnect hose is provided which may be secured to a union 170. In the past it has been considered necessary to provide either two such nozzles or to provide a specially shaped nozzle to obtain crossed air flows. It has been found that the structure according to the present invention is so effective that a simple nozzle is all that is required.

It will be appreciated that the present invention is subject to various modifications which do not deviate from the scope of the claims appended hereto.

What is claimed is:

1. Apparatus for peeling casings from a string of sausages comprising drive means for engaging the string of sausages and driving that string along a peeling path, said drive means comprising two spaced apart sets of two drive wheels, the wheels of each set being disposed on opposite sides of said peeling path, a knife assembly disposed adjacent said path to slit the casings of the sausages longitudinally, said knife assembly being located close to a downstream one of said sets of drive wheels, a hollow, perforated wheel disposed downstream of said knife assembly, housing means disposed about said wheel, a portion of said wheel closest to said path projecting from said housing whereby sausages, the casing of which are slit, pass over said portion of said wheel along said path, means applying suction to the interior of the wheel causing said casings to be removed from said sausages and adhere to said wheel and allowing sausages from which said casing is removed to continue along said path, guide means in said path for determining the position of said string of sausages relative to said knife assembly and support means, said guide means being releasably mounted in said support means, said support means comprising a bracket disposed between said sets of drive wheels and having a through opening, said peeling path extending through said opening, said guide means comprising a plurality of guide elements dimensioned for different sizes of sausage, a selected one of said plurality being mounted in said support means and the remaining guide elements being available for replacement of said selected one of said guide elements, each guide element comprising a ring shaped member having an external annular shoulder separating a first portion of said member of a diameter equal to said through opening of said bracket and received in that through opening, from a portion of larger diameter than said through opening whereby said shoulder of said selected one of said guide elements abuts said bracket adjacent said through opening and on an upstream side of said bracket, said shoulder and said first portion of said ring shaped member constituting the sole means supporting said guide element in said bracket whereby said guide element is easily removed for replacement and for cleaning.

2. Apparatus as claimed in claim 1 wherein said vacuum wheel is driven by means of an extended axle thereof said axle having a bevel gear mounted thereon, said bevel gear meshing with a corresponding bevel gear of a drive shaft element whereby said wheel is readily disengaged and removed from said drive means.

3. Apparatus as claimed in claim 1 wherein said knife assembly is supported on said bracket.

* * * * *